United States Patent Office 3,038,144
Patented June 5, 1962

3,038,144
SEISMIC FIRST BREAK TIME COUNT SYSTEM
Robert Edward Ward, Calgary, Alberta, Canada, assignor to Texaco Inc., New York, N.Y., a corporation of Delaware
Filed Sept. 3, 1959, Ser. No. 837,866
3 Claims. (Cl. 340—15)

This invention is concerned with a seismic time counter. More specifically the seismic counter according to this invention involves an electronic counter including a gate that is adapted to count the time between a time break and the first arrival of seismic energy on each channel, or trace.

Heretofore, it has been the practice in working with seismic records to determine the time interval between a time break signal and the first arrival signals, by manually observing and counting the time base marks on a record. In present day seismic procedures, the record is usually made on magnetic tape and the processing or computation of the data that had been recorded is accomplished at a central location with the use of playback equipment. In spite of this advance in the technique, it has been the practice still to determine the time interval (between a time break on a given record and each of the first energy arrivals) by manually counting the time as recorded, from some type of visual reproduction of the record. This manual operation is quite time consuming, and in addition it is apt to be relatively inaccurate.

Consequently, it is an object of this invention to provide a system for automatic measuring of the time interval between the time break signal and a selected first arrival signal. This is accomplished by the digital counting of a relatively high frequency pulse source, so that the time of such pulses which are passed between the time break interval and the first arrival for a selected trace, may be accurately determined. The system according to this invention may be connected to a seismic record playback equipment in such a way that the entire operation of determining the time count desired is automatic and may be accomplished without wasting the operators time and efforts in making the manual determination.

Briefly, the invention may be described as a seismic first break timer. Such timer comprises in combination, an electronic gate and a high frequency source of timing pulses. In addition the timer comprises counting means for counting the number of said pulses that are passed through said gate, and means for receiving a time break signal to open said gate. The timer additionally comprises: selective switch means for providing a predetermined first break signal; means for receiving said selected first break signal to close said gate; read out means for determining the number of pulses counted; and means for identifying the first break signal.

One embodiment in accordance with the invention is described below and is illustrated in the drawings, in which.

Figure 1:
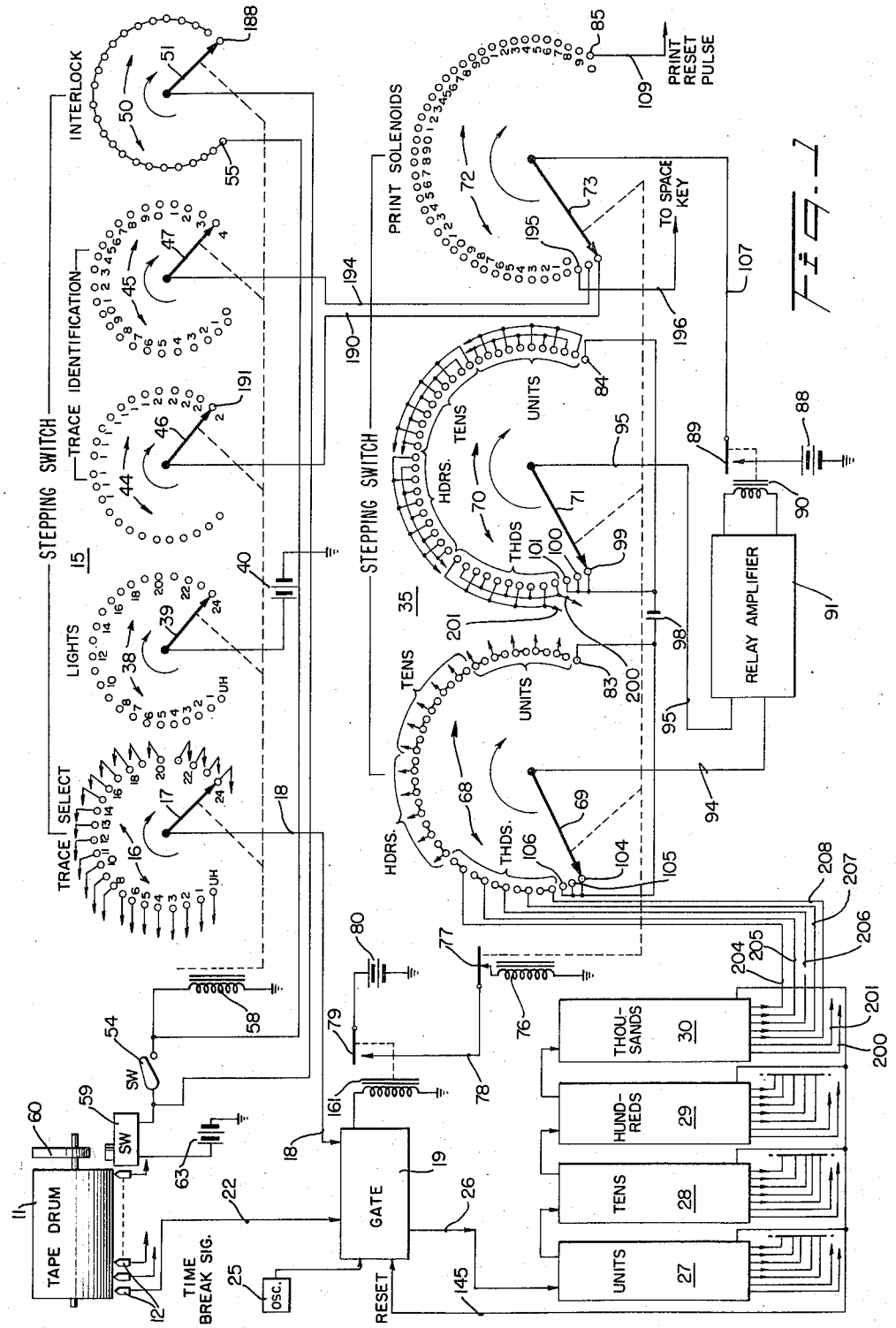
FIG. 1 is a schematic showing of the principal elements of the system according to the invention.

FIG. 1 illustrates the complete system in accordance with a preferred embodiment of the invention. This system is applied for use with a magnetic tape record (not shown) that is transcribed by use of playback equipment. Such playback equipment includes a tape drum 11, upon which the magnetic tape (not shown) which has been recorded previously, will be fastened for the transcribing of the recorded data. The transcription involves the use of a plurality of pickup heads 12, one for each channel of data on the tape.

The number of channels of data on a magnetic tape may vary quite widely, but in the illustrated system there are twenty-four channels plus an additional channel for uphole data. Each of these twenty-five channels has the pickup head 12 thereof connected individually to a switch contact 16 of a bank on a multiple-bank stepping switch 15. Thus, stepping switch 15 has the bank of contacts 16 that are individually connected to one of the pickup heads 12, as indicated by the small number captions that identify each contact with a trace on the record that is associated with a corresponding pickup head 12.

Contacts 16 are selectively connected to a single sweep arm 17 that is pivoted at one end thereof and thus may sweep over the circle of contacts 16, to individually make connection with the contacts. In this manner a selected circuit is connected from one of the pickup heads 12, via the sweep arm 17 and a selected one of the contacts 16, over a circuit connection 18 that leads to an input of an electronic gate 19.

Another input connection to the gate 19 is for control purposes in opening the gate. This input includes a circuit connection 22 that is marked with the caption "time break signal," and that leads from another one of the pickup heads 12 associated with the tape drum 11.

It is pointed out that there may be various arrangements for connecting the time break signal circuit, from the tape drum 11 to the gate 19, since often times the time break signal is recorded on one of the channels that is also employed for seismic input data. However, in order to simplify and make more clear this disclosure, there is shown a separate channel employing a separate pickup head 12 for carrying the time break signal (that is to be transcribed from the magnetic tape on drum 11), and for carrying such signal to the gate 19 for control thereof.

As has been indicated above, the purpose of this system is to automatically make a time count between the time break signal and each of the various channels of seismic data that are on a record. This timing is carried out by employing, as the time base, a stable and accurate oscillator 25 that feeds its constant frequency signals into an input of the gate circuits of electronic gate 19. Then, when the gate 19 is open the oscillator signals are passed through the gate, and shaped to form square wave type pulses that are then passed over a circuit connection 26 to the input of counter element 27. There are three additional counter elements, or units 28, 29 and 30, which are cascaded so that the total count may be carried to four decimal places.

After the time break signal has opened the gate 19 and the (clock pulse) oscillator signals from oscillator 25 have been passing into the counter units 27 through 30; the appearance of the first energy signal from the selected one of the twenty-five channels (after passing over the circuit from the corresponding pickup head 12 and the selected circuit contact 16 via switch arm 17 and the circuit connection 18 to gate 19) will act to close the gate and block the passage of the oscillator clock pulses. Then, the count of the number of clock pulses which passed through the gate 19 during the time while it was open, will be read off from the indicated read-out circuits on each of the counter units 27 through 30 so as to determine and indicate the total count.

Such readout of the count that stands on the counter units 27 through 30 is accomplished by employing another plural-bank stepping switch 35. There are forty-four contacts on each bank of the stepping switch 35; and the arrangement is such that there are additional functions carried out besides that of scanning the output circuits for the counter units 27–30. In this manner, part of the system operation will be carried out along with the readout of the count on the counters. These additional functions involve the circuits connected to the first three contacts of each bank of the stepping switch 35, beginning with the left hand side of the banks as they are shown in FIG. 1 in each case; and also they involve the last, or forty-fourth contact on each bank. The additional functions will be described in greater detail below, as will also the scanning circuits and readout arrangements that are involved with reading the count from the counter units 27–30.

It is pointed out that the stepping switches 15 and 35 are well known commercial structures that may be readily purchased, and may take various forms. Thus, the structure of these switches forms no part per se of the invention and the structural arrangement is merely schematically indicated in FIG. 1. In this connection it is pointed out that the stepping switch 15 has five banks of contacts and contact arms, including the bank of contacts 16 with arm 17 therefor, plus a bank of contacts 38 with arm 39 for contacting same. The latter bank on the switch 15, is employed for visual indication of the channel, or trace that has been selected for a time count, from the record that is being scanned on the tape drum 11. Thus, since the contact arm 39 is connected to rotate in unison with arm 17 at all times so as to make contact with a corresponding one of the bank of contacts 38 (with respect to the contacts 16 that are connected to individual ones of the pickup heads 12); the indication function is carried out by having a voltage source, such as a battery 40, connected to the pivot end of arm 39 for applying the voltage from this battery to the selected one of the contacts 38. Then, of course, the circuit for the selected indicator light will be completed by a ground return as indicated.

Two other banks of contacts on the stepping switch 15 are made up of contacts 44 and contacts 45. These banks of contacts have contact arms 46 and 47 respectively, for selecting corresponding ones of the individual contactors. The contact arms 46 and 47 are rigidly connected for operation in unison with all of the other contact arms of the total stepping switch 15 i.e. with arms 17 and 39, so that they all rotate in unison to corresponding contacts of the individual banks. Contact banks 44 and 45 are employed for trace identification via a printed record that is made in connection with permanently recording the timing counts of the system. This arrangement will be described in greater detail below, but is generally indicated by the captions adjacent to banks 44 and 45.

There is a fifth bank of contacts 50 on the stepping switch 16 which has a sweep arm 51 that makes contact therewith. The contact bank 50 is employed to provide a so called interlock function, as indicated by the caption. The operation of this function will be described in greater detail below. However, it may be noted that there is a manual switch 54 that is bypassed by the contact arm 51 when it is in contact with each one of the bank of contacts 50 except the last contact thereof (beginning with a contact 55 and going clockwise around the bank of contacts 50, when viewed as illustrated in FIG. 1).

All of the arms on stepping switch 15 are rotated in a stepwise fashion, in unison, by means of a solenoid 58 that acts when energized to activate a ratchet structure (not shown) for ratcheting all of the sweep arms one step each time it is energized. The energization of solenoid 58 is controlled by a cam actuated switch 59 that is closed periodically by a cam 60 carried on the playback equipment, which includes the tape drum 11. Thus, an energizing pulse will be sent from a source such as a battery 63, to energize the solenoid 58 each time that switch 59 is closed by the cam 60. Of course, such energizing pulse will be sent only so long as either switch 54 is closed, or the bypass circuit that includes the contacts 59 and sweep arm 51 is closed in the alternative.

As will appear more fully in connection with the operation description, the arrangement described above provides for stepping the switch 15 one position each time that switch 59 is closed by the rotation of the tape drum 11 which carries the cam 60 therewith. It is contemplated that the stepping switch 15 will be a continuous rotation type of structure such that the steps of movement of the sweep arms 17, 39, 46, 47 and 51 will continue, with rotation in the same direction, for any plural number of rotations of the shaft or whatever structure carries the sweep arms around. Thus, by way of illustration, the stepping switch 15 may be similar to structure that takes the form illustrated by the manufacturer of Guardian relays. Specifically it is designated as a series R of stepping relays, and is described in the catalog 10–B of the Guardian Electric Manufacturing Company Inc., Chicago, Illinois.

The stepping switch 35 is of a basically different structural type, in that it has a reset structure for returning the sweeping arms thereof to the starting position, after each full sweep has been completed. Thus, referring to FIG. 1 illustration, there is shown a first bank of contact 68 that have a sweep arm 69 for individually contacting same. A second bank of contacts 70 are swept by a contact arm 71; while a third bank of contacts 72 are swept by contact arm 73. The contact arms 69, 71 and 73 are actuated in a ratcheted stepwise fashion from one contact of each contact bank 68, 70 and 72, to the next by a stepping solenoid 76. In this instance, the stepping switch 35 includes a motoring-contact switch 77 so that the stepping switch will continue to step in an uninterrupted fashion from one contact position to the next, for any predetermined number of steps, so long as the circuit that includes a connection 78 and relay contacts 79, is closed to complete a circuit for supplying a source of energy such as a battery 80 that will thus energize the solenoid 76 by the ground return circuit illustrated. As will appear more fully below, the operation of stepping switch 35 is such that when the relay contacts 79 are closed, they will tend to remain so and the solenoid 76 will be energized in a motoring fashion to continuously step the sweep arms 69, 71 and 73 all the way around over the contact banks until the last contact position is reached. Then the sweep arms will be mechanically reset, under control of an additional electrical tripping solenoid (not shown) which will be energized over a branch circuit connection (not shown) in conjunction with the circuit that is completed at the last contact position of the stepping switch 35.

The last contact position includes a contact 83 on bank 68 and a contact 84 on bank 70, plus a contact 85 on bank 72. The circuit including contact 85 is employed to energize the reset coil when the arm 73 makes contact with the contact 85. This circuit includes a source of energy, such as a battery 88, that is connected via contacts 89 of a relay 90, that in turn is energized from a relay amplifier 91. The relay amplifier 91 has an input circuit for determining the energization of the relay 90. This input circuit includes a pair of circuit connections 94 and 95. These connections lead to the sweep arms 69 and 71 respectively, of the contact banks 68 and 70 of stepping switch 35. The energization determining signal may be that from a battery 98 which has one terminal thereof connected to the last contact 84 (in addition to the first three contacts 99, 100 and 101); while the other terminal of battery 98 is connected to contact 83 (plus the first three contacts of the bank 68, i.e. contacts 104, 105 and 106). Thus, when the contact arms 69, 71 and 73 reach their last position, i.e. in contact with the contacts 83, 84 and 85 respectively; the input to relay amplifier 91 will be energized by the signal from battery 98 that is then connected to the input thereof via the connections 94 and 95. Therefore the relay 90 will be energized and the contacts 89 thereof will be closed, so that the battery 88 will be connected via a circuit connection 107 to arm 73 and then over contact 85 to an output circuit that is marked with the caption "print and reset pulse." The latter circuit is completed from contact 85 via a connection 109. Also, it will include the required circuit for energizing the above mentioned reset coil (not shown) that will trip the latch for causing mechanical reset of the three contact arms 69, 71 and 73 of stepping switch 35.

Figure 2:
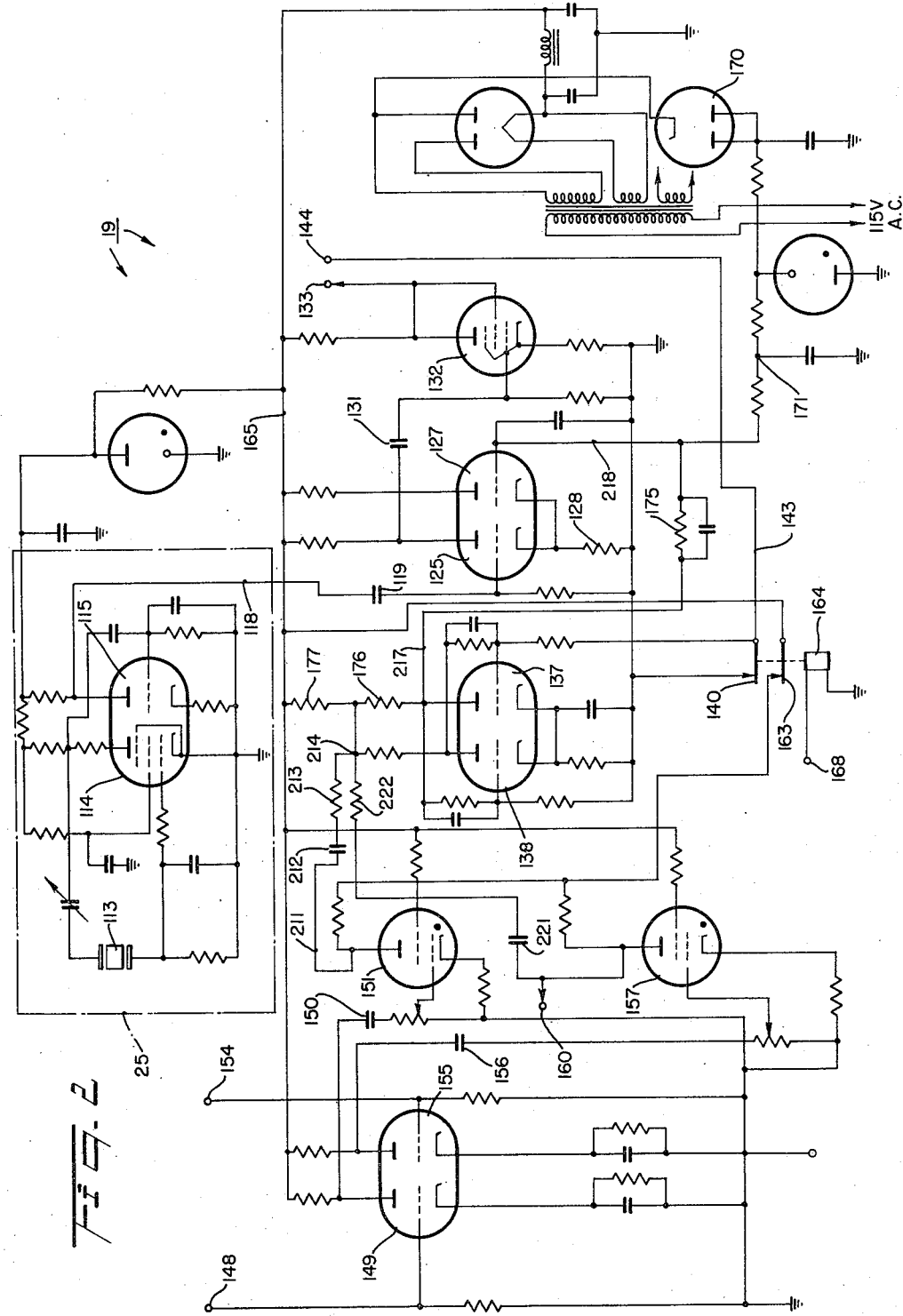
FIG. 2 is a schematic circuit diagram, showing some of the details of the oscillator and of the gate, both of the system.

*Fig. 2 Circuit*

FIG. 2 shows the details of the oscilllator 25 and the gate 19. These two elements are shown in block form in the FIG. 1 system. The oscillator 25 may provide a predetermined frequency as desired, that will provide the required periodic pulses for counting the time to a desired degree of accuracy. This oscillator must of course, be a stable type of oscillator that will maintain a predetermined frequency to a high degree of constancy and accuracy.

In the illustrated system the oscillator is a crystal controlled type of accurate oscillator circuit, which maintains a frequency of ten thousand cycles per second so that the time count is broken into time intervals of $\frac{1}{10,000}$ of a second. Since the interval of time to be counted is that between the time break and the first arrival on a seismic record, there is never such a great length of time but that a total interval of one second will be quite adequate. For this reason there are just the four counter units employed, i.e. counter unit 27, 28, 29 and 30. These are decade type counters which provide an output pulse with the tenth input pulse. Thus, by using four counter units in cascade, a total pulse count of nine thousand nine hundred and ninety-nine may be provided for. This means that a one second interval is covered by the pulse count, all the way through the penultimate one of the ten thousand pulses.

The particular oscillator employed is that part of the FIG. 2 circuit shown enclosed by the dashed line box 25. This oscillator is a crystal controlled type having a ten thousand cycle crystal 113 connected in a controlling manner in the circuit of a pentode tube 114. There is a triode amplifier tube 115 that is connected to the oscillator tube 114, and that passes amplified signals in accordance with the oscillator frequency, on to the gate via a circuit connection 118 that leads from the plate circuit of triode 115 to a coupling capacitor 119.

The gate 19 (FIG. 1) includes (in the FIG. 2 circuit) a gating triode tube 125 that receives the oscillator signals as transmitted via the capacitor 119, to the grid of gate tube 125. This gate tube 125 acts to pass the signals from the oscillator when it (tube 125) is conducting, but to cut off or block the signals when it is nonconducting. Control of the gate tube 125, from conducting to nonconducting state is provided by a companion triode tube 127 that has the cathode thereof connected in parallel with the cathode of gate tube 125 so that there is a common cathode resistor 128. In this manner, when the triode 127 is rendered conducting, the negative bias that is applied to gate tube 125 is increased by reason of the voltage drop across the resistor 128 and the gate tube 125 is thus cut off, or rendered nonconducting. However, when the gate control triode 127 is cut off no current flow therethrough will be had, and consequently the negative bias on gate tube 125 is reduced so that it becomes conductive and will pass the oscillator signals that are applied thereto.

When the gate tube 125 is conductive and passing the signals from oscillator 25 via the capacitor 119, the output of oscillator signals will be carried via the circuit shown which includes a coupling capacitor 131 that couples the signals to the input of a shaper tube 132. The output of shaper tube 132 then provides square wave pulses at a clock pulse terminal 133. This terminal 133 will be connected to the connector 26 of FIG. 1 to carry the clock pulses from gate 19 to the units counter 27.

The conducting or nonconducting state of the gate control tube 127 is determined by the state of a bistable flip flop double triode circuit that employs a pair of triode tubes 137 and 138. These two triodes are cross connected in a known manner for creating a bistable flip flop circuit such that either one or the other of these two tubes is conducting while the other is cut off. Furthermore, as is well known with such type of trigger or flip flop circuit, an input pulse may be applied that will flip the circuit over from whichever state then exists to the opposite state. Also, in order to ensure that the proper one of this pair of tubes is conducting at the beginning of an operation cycle in the system, a reset connection is made in the grid circuit of the tube 137. This involves the grid to ground connection via a resistor 139. For reset this circuit is broken at relay contacts 140.

It is pointed out that there is a similar additional reset circuit connection 143 that leads from the normally closed relay contacts 140 to a reset circuit terminal 144. This additional reset circuit is for connecting for reset the counter units 27, 28, 29 and 30 in connection with the control circuitry of the gate 19. This connection to the counters has been shown in FIG. 1, and is indicated by the caption "reset" applied to a circuit connection 145.

There are two paths for input signals that will act to flip the trigger or flip flop pair of tubes 137 and 138, from one state to the other. One of these paths leads from a terminal 148 to the input of a triode amplifier tube 149, which is in turn coupled via a capacitor 150 to the grid of a gas tube 151. The plate circuit of the gas tube is coupled to the input of the trigger over a circuit that will be described in more detail below. The other path is that leading from a terminal 154 to the grid circuit of an amplifier tube 155 that has the output thereof connected via a capacitor 156 to the control grid of another gas tube 157. The plate of this gas tube 157 is also coupled to the input of the trigger in a similar manner, which will also be described in more detail below.

The use of gas tubes as the medium for carrying the control signals over these two paths, is for the purpose of avoiding any spurious signals following the first arrival that is to control the opening or shutting of the gate. This effect will be had because of the nature of a gas tube, such that once it has been tripped or caused to become conducting it will remain so irrespective of the grid signals applied.

It is pointed out that the terminal 148 (FIG. 2) will be connected to receive the circuit connection 22 (FIG. 1) that carries the time break signal. And, the terminal 154 will be connected to the circuit connection 18 of FIG. 1 to receive the first arrival, or P wave signals from whichever of the pickup heads 12 on the twenty-five channels, is connected to the circuit 18 at that time.

There is an additional output circuit from the gas tube 157 that leads to a terminal 160 (FIG. 2) which will be connected to the required elements for causing energization of a relay 161 (FIG. 1) which is actuated at the closing of the gate. This will start the operation of stepping switch 45, which continues automatically to the end of the sweep thereof.

The reset operation includes a resetting of the gas tubes 151 and 157 by opening the plate supply thereto. This is carried out over the illustrated circuit connection which includes normally closed switch contacts 163 that will be actuated to open position by a relay coil 164 that controls the actuation of the contacts 163 as well as the contacts 140 mentioned above. Thus, contacts 163 are in the plate supply circuit for the plates of gas tubes 151 and 157. This circuit leads from the plates of these tubes in common to a high voltage supply line 164 that has a positive plate supply voltage applied thereto by means of the full wave rectifier source illustrated.

It will be observed that the relay coil 164 is connected to ground at one end thereof, while the other end of the coil is connected to a terminal 168. The terminal 168 will be connected to the circuit connection 109 (FIG. 1) so that the signal for energizing relay coil 164 (FIG. 2) may be supplied from the battery 88 (FIG. 1) when the sweep arm 73 of the contact bank 72 of stepping switch 35 has reached the contact 85 of the bank. In this manner the entire reset function including resetting of the gate 19 and the resetting of the counter units 27–30, are all accomplished simultaneously when the last position of the stepping switch arms 69, 71 and 73 has been reached.

It is pointed out that there is a negative high voltage supply provided in order to create the required voltage conditions for applying a swing of sufficient magnitude to the grid of gate control triode 127. This negative supply is provided by connecting a diode 170 in the conventional manner for providing a negative high voltage D.C. potential at a point 171, which is the low voltage end of a potentiometer circuit that is made up of four resistors 174, 175, 176 and 177. These four resistors are connected in series from the high voltage supply line 165 to the low voltage, or negative high voltage, point 171. In this manner the voltage applied to the grid of the gate control tube 127, may be set to a desired value in the absence of the conducting state of triode 137 of the flip flop pair. At the same time the values will be such that when the triode 137 is conducting, the potential applied to the grid of the gate control triode 127 will be shifted to a sufficiently more negative value such that the tube 127 will be cut off.

Figure 3:
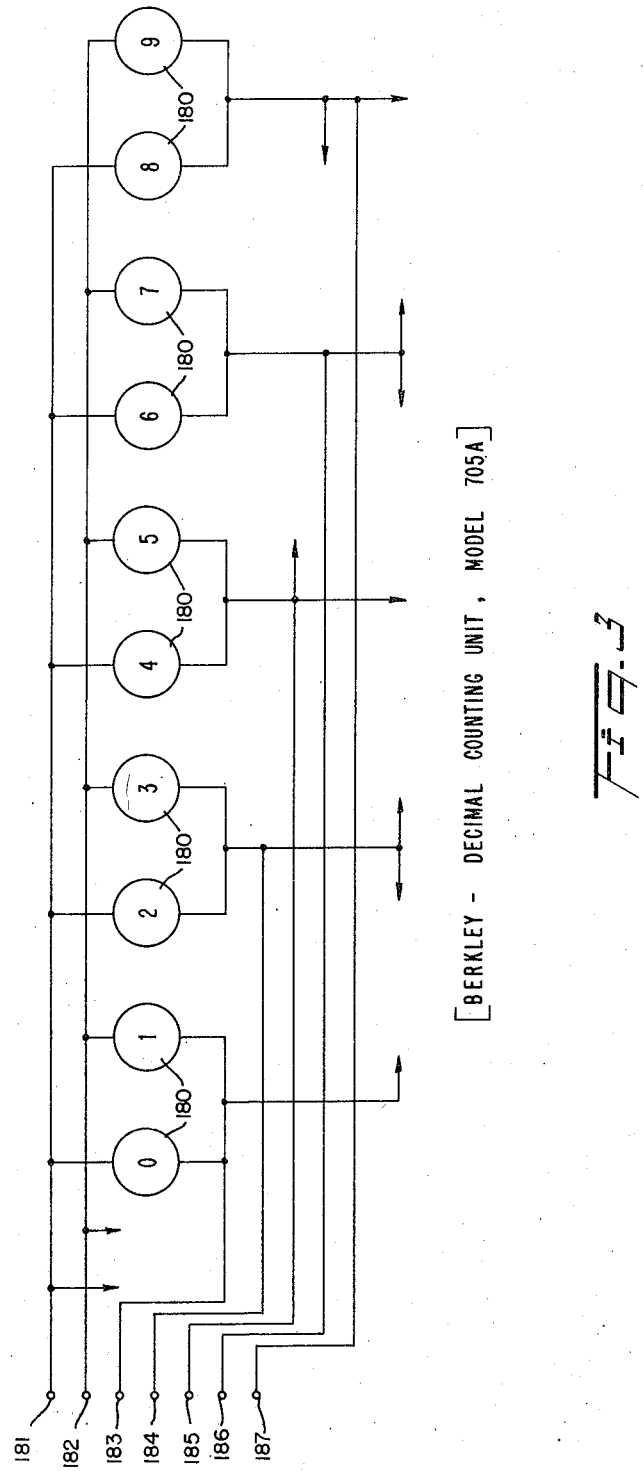
FIG. 3 is a schematic, partial circuit diagram, indicating the changes that have been made to a commercial counting unit in order to adapt same for use with the invention.

*FIG. 3 Circuit*

It will be understood that the counter units 27, 28, 29 and 30 may take any feasible form, and thus might be any high speed electronic counter that is capable of counting the required number of pulses at the rate introduced. Thus, there are undoubtedly many different counter units that could be employed. However, it is preferred to employ four of the units that are manufactured by Beckman Instruments Incorporated of Richmond, California; and that are designated as the Berkley Model No. 705A. Each such unit 27–30 as thus employed, is modified slightly from the commercial unit as purchased from the manufacturer. The modification includes adding of circuits as indicated in FIG. 3.

Therefore, whereas the commercial units, before alteration or modification thereof, include signal output circuits to energize ten counter lamp indicators 180 that are provided with Arabic numeral indication as shown in FIG. 3; the units as used in the system according to this invention each add seven circuit connections that lead to a group of terminals 181 through 187. By bringing out these circuits to the seven terminals, there will be a potential applied from certain combinations of these terminals. These combinations may be classified into two groups. One group involves the combining of terminal 181 with terminals 183–187. The other group involves combining terminal 182 with terminals 183–187. By using these circuits, potentials exist in parallel with the indicator lights 180 when they are energized, depending upon which of the indicators is energized. This provides output potentials in accordance with the following combinations.

No. 0 indicator light potential between terminals 181 and 183
No. 1 indicator light potential between terminals 182 and 183
No. 2 indicator light potential between terminals 181 and 184
No. 3 indicator light potential between terminals 182 and 184
No. 4 indicator light potential between terminals 181 and 185
No. 5 indicator light potential between terminals 182 and 185
No. 6 indicator light potential between terminals 181 and 186
No. 7 indicator light potential between terminals 182 and 186
No. 8 indicator light potential between terminals 181 and 187
No. 9 indicator light potential between terminals 182 and 187

It will be appreciated that the Berkley counter, Model 705A is constructed so that as the pulses being counted arrive, the circuits for indicating the total count (up to nine) will be energized so as to provide an indication thereof from zero to nine after each pulse has arrived. Then, when the tenth pulse arrives, the circuits return to the zero indication state while at the same time an output pulse is provided that will be connected to the next counter unit in the cascade series. Thus, as employed in this invention, when the gate is closed and the pulses stop arriving at the input of the counter units 27–30; the units will stand with an indication that shows the total count, or number of pulses which have been introduced, up to the maximum as indicated above (which in this case is nine thousand nine hundred and ninety-nine). At this time the visual indication of the total count may be read off from the indicator lights on the counter units; but in order to make use of the count in printing out the results, the arrangement using stepping switch 35 is employed and thus the combination of potentials at the output terminals 181–187 is made use of in accordance with the circuits shown in FIG. 3.

*Operation of the Entire System*

It will be appreciated that various details of the operation of the system may vary, depending upon the particular structural elements and the manner in which they are interconnected for operation.

A magnetic tape (not shown) will be placed in contact with the surface of the drum 11 so as to be in operative relation with the pickup heads 12 and having the corresponding channels of data adjacent the proper pickup head, as is the conventional arrangement of seismic magnetic tape playback apparatus. Then, a playback drive motor (not shown) will be started, to cause rotation of the drum 11. Of course the cam 60 will be rotated therewith. It will be appreciated that the cam 60 may be set in various positions relative to the drum 11, so that the switch 59 will be closed at a predetermined time relative to the data on the record that is being transcribed. Also it will be understood that the closing of switch 59 to cause the arms 17, 39, 46, 47 and 51 to advance one step, may be thus set to occur at different times relative to the record without substantially altering the principles of the operation. Consequently, under one arrangement, shortly after the drum 11 commences to rotate for the first transcribing rotation (in order to make the uphole time count) the cam 60 will depress switch 59 and close its contacts so that a circuit is completed via the switch 54 to energize the stepping coil 58 of the stepping switch 15. This energization of the stepping coil 58 will cause the bank of contact arms 17, 39, 46, 47 and 51 to be stepped one position so that they will occupy the first, or uphole, position and connect the counters 27–30 to the uphole pickup head 12 for determining the uphole time. This is assuming that the system has been started where it was standing after the end of a complete automatic scanning operation of a previous record.

Thus, as the drum 11 continues to rotate from its position at the beginning of a record, the signals being transcribed from the record thereon will appear at the pickup heads 12 and the first signal (starting in time from the beginning of the record) will be the time break signal, that will appear on the circuit of connection 22 and will act to open the gate 19.

Then shortly thereafter, the first arrival, or P wave signal that exists on the uphole trace; will be picked up by the pickup head 12 for the uphole channel, and this signal will pass over the circuit from uphole pickup head 12 to the uphole contact 16 of the left-hand bank (as viewed in FIG. 1) of stepping switch 15. At this time the contact arm 17 will be in connection with the uphole contact 16 and so the uphole first arrival signal will pass over the circuit connection 18 into the gate 19, to close the same. Thus, during the interval between the time break signal (which opened the gate 19) and the first arrival uphole signal (which closed the gate 19), the oscillator time count pulses from oscillator 25 will pass through the gate 19 and enter the counter units 27, 28, 29 and 30 to register the total count of such pulses.

Thereafter, the tape drum 11 will continue to rotate for the remainder of the record (which physically takes up the peripheral distance of the surface of drum 11) without having any further effect on the time count system, until the next revolution of the drum.

At the beginning of the next revolution of drum 11, cam 60 will again close the contacts of switch 59 and will once more energize the stepping coil 58 to step the contact arms of the stepping switch 15 to the next position. The switch 54 will have been opened after the first ratchet step of switch 15 has been completed, so that the next (and succeeding steps up to the last) will take place under control of the bypass circuit around switch 54 which includes the bank of contacts 50 and contact arm 51 of the "interlock" bank on stepping switch 15. It is pointed out that all contacts 50, from the first contact 55 through the penultimate one, are connected together to make a continuous circuit until a final contact 188 is reached.

After each count (of the number of oscillator pulses between the time break signal and the first arrival signal on the selected channel) has been completed; the total will be read out for printing, or otherwise recording its value, by means of the arrangement that includes the stepping switch 35. Such read-out action will be commenced upon the closing of the gate 19 and will take place during the time remaining thereafter while the drum 11 completes its revolution. The read-out of the total count information is accomplished during a single sweep of the stepping switch 35.

The first information read out, as the stepping switch 35 commences its sweep, is the trace identification which indicates which of the channels of the record on tape drum 11 is connected to the timing gate, for that particular time count. This read-out indication involves a circuit that includes two banks on the stepping switch 15.

It is pointed out that the read-out of the information might be done in various ways, but it is contemplated that a preferred manner is to provide for a print-out of the numerical data on a columnar type of print machine which has at least four columns of digits to represent units, tenths, hundredths and thousandths. Such print-out machine is not illustrated, but it will be clear that it should also include a space key and room for additional columns so that the trace identification digit or digits may be separated from the total count digits.

It is contemplated that a satisfactory print-out machine to meet these requirements may be had by simple alteration of an electric adding machine so as to provide electric solenoids for actuating the keys of such machine. In this manner the required digit numerals will be printed when the solenoids in actuating relationship with given keys are energized. These solenoids will be connected to the indicated switch contacts on the bank of contacts 72 of the stepping switch 35, as well as to the designated contacts on banks 44 and 45 of the stepping switch 15. Thus, two of the columns on the print-out will be employed for trace identification, while all four columns will be employed in providing the total count indication.

The trace identification print-out takes place as the stepping switch 35 steps over its first three contact positions. Thus, as the contact arms 69, 71 make contact with the contacts 104 and 99 first, and then successively with contacts 105 and 100, plus contacts 106 and 101; the input circuit for relay amplifier 91 will have the voltage of battery 98 applied thereto, so that the relay 90 will be energized and the contacts 89 thereof will be closed. Consequently, at each of these first three positions, the battery voltage of battery 88 will be applied to the print solenoid for identifying the particular trace that is then connected and has had a time count thereof just completed.

For example, assuming that the last trace of a record has just been counted, and the gate 19 has closed so that the stepping switch 35 has commenced its sweep. The battery voltage of battery 88 will then be first applied via the sweep arm 73 over a circuit connection 190 to the arm 46 of the stepping switch 15. At this time arm 46 will be connected to a contact 191 on the bank of contacts 44. Contact 191 is connected to the numeral two solenoid on the print out machine that will register in the first or left hand column of the two digit columns that are employed for trace identification. Next, the stepping switch 35 moves to its next position and again the relay 90 will be energized so that the battery voltage 88 will be applied to the circuit at the next contact of the bank 72. This contact is connected via a circuit connection 194 to the arm 47 which is in contact with the last contact on the bank 45. This contact is, in turn, connected to the solenoid which will actuate the numeral four print-out digit in the right hand column of the two columns used for trace identification. Then, upon the third step of the stepping switch 35, the arm 73 will be connected to a contact 195 that has a circuit connection 196 connected thereto. Connection 196 leads to a solenoid for actuating the space key on the print-out machine; in order to space the trace identification numbers from the total count numbers that will follow.

For the next ten steps of stepping switch 35, while the arms continue to contact the contacts of each bank in unison; the resulting circuits connected are such as to affect a scan or sweep thereof that tests the output circuits of the thousands unit counter 30, to determine what numeral count exists on this counter. This count in the thousands column must be only one digit, and may be anything from zero through nine. Whatever it happens to be (depending upon the total count of pulses while gate 19 was open) will determine which voltage on the combination of output circuits will be present, in accordance with the description above pertaining to FIG. 3. The voltage that thus exists at the particular contacts of the thousands group of contacts (which are indicated in brackets on the contact banks 68 and 70 of stepping switch 35) is indicative of the thousands place digit. Whatever digit is thus indicated, will provide an energization pulse for the corresponding print solenoid on the print-out machine by reason of the fact that the arm 73, on the print solenoid bank of the stepping switch 35, will be then connected to that circuit for such solenoid.

The foregoing action may be reviewed with reference to the circuits illustrated in FIG. 1, in the following manner. The voltage that exists on one pair of the output circuits of the counter unit 30, will be applied to the input of the relay amplifier 91 via the contact arms 69 and 71; so that the corresponding numeral print solenoid pulse, will be applied as the voltage from battery 88 so long as arm 73 remains in contact with that one of the contacts 72. This scanning of the output connections of each counter unit, e.g. unit 30, will be clear by observing the connections shown from unit 30 to the stepping switch banks 68 and 70. In this regard it is pointed out that the two common circuit connections from counter unit 30 (that are internally connected to the terminals 181 and 182 shown in FIG. 3) are a pair of circuit connections 200 and 201 shown.

It will be observed that connection 200 leads to every other one of the contacts 70 in the bank of stepping switch 35 that is contacted by the arm 71. Referring to FIG. 3, it will be observed that these contacts of the bank 70 are those which are connected in common to the even numbered digit indicators 180, i.e. 0, 2, 4, 6 and 8. Similarly, the connection 201 goes to the alternate ones of the contacts 70; and these are the ones that lead in common to the odd numbered digit indicators.

There are five other circuit connections 204, 205, 206, 207 and 208. Each of these connections carries the output signals for representing which of the digit circuits of the counter output is energized. It will be observed that adjacent pairs of the contacts 68 are connected together so that they both go to the same circuit connection for providing the required combination of circuits as the arms 69 and 71 sweep over the respective contact banks.

Thus for example if the counter unit 30 stands with a zero count the stepping switch 35 will provide an indication of this state, and cause a print-out of a zero when the switch arms reach the fourth contact position. In this position the circuit connection 208 is connected via arm 69 to circuit connection 94 for one side of the input circuit to relay amplifier 91. At the same time the arm 71 will be in contact with the contact 70 that is connected to the circuit connection 200, and thus the circuit for the other side of the input to relay amplifier 91 is made over the circuits that lead from terminals 181 to 182 as shown in FIG. 3, which provide the voltage that will exist when the zero output or indicator light is energized. Therefore relay 90 will be energized and consequently contacts 89 will be closed to apply the battery voltage from battery 88 to the fourth contact 72 via the arm 73, so that the thousands column zero solenoid on the print-out machine will be energized. As the stepping switch 35 continues to its succeeding positions, there will be no voltage found to exist at the remaining (next) nine positions of the thousands group of contacts.

The next group of contacts will be the ten that are connected to the output of the hundreds counter unit 29, and consequently the same sweep, or search operation takes place there, which will cause the print-out machine to print (in the hundreds column) a digit that is indicative of the count in counter unit 29. Of course the stepping switch 35 continues to step, and therefore sweeps and reads out the count on the tens column and finally the units column, before the last position of the stepping switch is reached.

At the last position of stepping switch 35 the arms make contact with contacts 83 and 84 on the bank of contacts 68 and 70 respectively, to provide the battery voltage 98 as the input for relay amplifier 91. This then, once more energizes relay 90; and this time applies the battery voltage of battery 88 via the switch contacts 89 to the "print and reset pulse" output circuit 109. The circuit connections include the contact 85 of the bank 72, the arm 73 and the connection 107. The functions that are carried out when this circuit is energized have been pointed out already, above, and they include the energization of the relay 164 (FIG. 2) as well as the energizing of the reset coil (not shown) on the stepping switch 35.

It may be noted that the bank of contacts 38 on stepping switch 15 is merely employed for circuits that may be used in connection with an indication of the position of stepping switch 15, which of course represents the trace that is then connected to the gate 19 for making the time count between the time break and the first break information on that trace. Thus, the battery 40 is selectively connected to a signal light (indicated by the caption) or otherwise to some indication of the particular circuit that is connected.

*Operation of FIG. 2*

The operation of the element illustrated in FIG. 2 will largely be apparent from the foregoing description of the elements therein.

It may be helpful to review the relationship and operation of the various elements by tracing the action of opening and closing of the gate to allow passage of the oscillator clock pulses through to the output that leads on to the counting unit.

Thus, beginning with a time break signal, it will arrive at the terminal 148 and then be amplified by the triode 149. Tube 149 will then pass the amplified signal via the capacitor 150 to the grid circuit of the gas tube 151. The gas tube 151, at this time, has its plate supply connected via the illustrated circuit that includes normally closed contacts 163 of the relay 164, and so the signal arriving on the grid of this gas tube 151 causes it to become conducting and thus drops the voltage on the plate down to a lower potential. This reduced potential signal, is transmitted over a circuit connection 211 to a capacitor 212 and then via a resistor 213 to a point 214. Point 214 is in the plate circuit network of the flip flop pair of tubes 137 and 138. This reduced voltage signal causes the tube 138, which was conducting, to swing toward nonconducting (i.e. reduce the current flow) and flip the trigger over so that it (tube 138) becomes entirely cut off while the other trigger tube 137 swings the other way and goes conducting. This flipping over of the flip flop pair, means that the grid of gate control tube 127 is made more negative so that this tube is cut off.

Such action (cut off of the tube 127) takes place by reason of a circuit connection 217 that goes from the plate of trigger tube 137, via the resistor 175 to another circuit connection 218 that goes to the grid of the gate control tube 127. When gate control tube 127 is thus cut off (made non-conductive), the gate tube 125 has its negative bias reduced so that it becomes conducting; and the oscillator clock pulse signals that are being introduced to the gate tube 125, on the grid circuit thereof (via the capacitor 119), will now pass through the tube 125. These signals are then transmitted via the coupling capacitor 131 to the shaper tube 132 for transmittal to the clock pulse output circuit, via the terminal 133.

So long as the gate remains open, i.e. gate tube 125 remains conductive, the clock pulses (at the ten thousand cycle rate) are passing through and appearing at the terminal 133 which is connected via the circuit connection 26 (FIG. 1) to be introduced to the input of the first counter unit 27.

Next, the first energy arrival (i.e. P wave signal) will arrive from the selected circuit of the particular channel, or trace that is selected, and will be transmitted via the circuit connection 18 (FIG. 1) to arrive at the terminal 154 of FIG. 2. This signal will be amplified by the tube 155, and transmitted via the coupling capacitor 156 to the other gas tube 157. Then, the signal created when gas tube 157 goes conducting, is transmitted via the circuit illustrated which includes a coupling capacitor 221 and a resistor 222 to the point 214 in the plate circuit network of the trigger tubes 137 and 138.

In this instance the action is similar to that created by the time break signal (via gas tube 151); but it is the reverse, since the trigger tubes will be flopped back to the first state. Thus, the first arrival signal, just described, will be a negative swing of potential that is applied at the point 214. This negative swing will carry the conducting tube 137 toward nonconduction sufficiently to cause the flip flop action again. This time it is acting to cut off tube 137 while causing tube 138 to pick up conduction and go into full conducting state. This flopping back of the trigger pair of tubes causes the plate potential of tube 137 to go up and thus applies a positive potential to the grid of the gate control tube 127. Such positive potential is applied over the same circuit as traced above, i.e. the circuit connection 217 to the resistor 175 and then via the circuit connection 218 to the grid of tube 127. This return to a positive potential on the grid of tube 127 causes it to become conductive and at the same time (because of the common cathode resistor 128) to cut off the tube 125, and so close the gate. Consequently, no more of the oscillator pulses pass the gate thereafter, and the number which have already passed since the gate was opened will have been counted by the high speed counter units 27–30 of the FIG. 1 showing.

It may be noted that when the second gas tube 157 goes conductive (as the first break, or P wave signal is received) a signal is created at the plate thereof. This signal is transmitted to a terminal 160 that is connected directly to the plate circuit of the tube 157. Such signal at the terminal 160 corresponds in time with the closing of the gate, and this signal is used to control the actuation of the relay 161 (FIG. 1) which then closes its contacts 79 and applies the battery voltage from battery 80 to the stepping coil 76 of the stepping switch 35. It will be noted that the relay 161 will remain energized until the complete sweep of the stepping switches of switch 35 has been completed and the last contact point reached. Then, the print and reset circuit is closed, at which time the relay 164 (FIG. 2) will be energized to open its contacts 163, which break the plate supply voltage for the gas tubes 157 and 151 so as to reset the entire system for another operation.

It is pointed out that the operation of stepping switch 35 will ordinarily be completed in plenty of time before the succeeding time count is to be taken, since the record that is being transcribed from the taped drum 11 takes on the order of four or five seconds to complete a transcription run thereof. In other words, the speed of travel of the tape drum 11 is quite slow so that a single revolution takes a four or five second period; while the time count that is involved from the time break signal to the first arrival, on any of the traces as they are individually selected, never exceeds a period of one second. This means that there is always ample time for the sweep operation to provide the print read-out of the count, following each time count period and before the tape has finished a revolution and then carried out its automatic switchover operation to the next channel.

It will be appreciated that the first arrival time count aspect of the invention, could be applied simultaneously to all channels of seismic data. However this would involve use of counting equipment plus a gate for each of the channels, so that the quantity of equipment needed would be great.

While a particular embodiment of the invention has been described in considerable detail, in accordance with the applicable statutes, this is not to be taken as in any way limiting the invention but merely as being descriptive thereof.

What is claimed as the invention is:

1. A seismic first break time count system, comprising record playback means having a signal pickup head for each of a plurality of channels, an electronic gate, a high frequency source of timing pulses, counting means for counting the number of said pulses passed through said gate, first circuit means for delivering a time break signal from said playback means to said gate for opening same, second circuit means including a selector switch for delivering a selected first break signal from one of said pickup heads to said gate for closing same, output circuits from said counting means for carrying signals in accordance with the count, and means for testing said output circuits to determine whether said count signals are present in order to utilize such count signals for indicating the count.

2. A seismic first break time count system, comprising record playback means having a signal pickup head for each of a plurality of channels, an electronic gate, a high frequency source of timing pulses, counting means for counting the number of said pulses passed through said gate, first circuit means for delivering a time break signal from said playback means to said gate for opening same, a stepping switch having a plurality of contact banks, second circuit means including one of said contact banks for selecting and delivering a first break signal from one of said pickup heads to said gate for closing same, output circuits from said counting means for carrying signals in accordance with the count, means for testing said output circuits to determine whether said count signals are present in order to utilize such count signals for indicating the count, an energizing circuit for said stepping switch including a cam actuated switch, and cam means actuated by said record playback means for closing said cam actuated switch once each revolution of said playback means to step said stepping switch to the next position.

3. A seismic first break time count system, comprising record playback means having a signal pickup head for each of a plurality of channels, an electronic gate, a high frequency source of timing pulses, counting means for counting the number of said pulses passed through said gate, first circuit means for delivering a time break signal from said playback means to said gate for opening same, a first stepping switch having a plurality of contact banks, second circuit means including one of said contact banks for selecting and delivering a first break signal from one of said pickup heads to said gate for closing same, output circuits from said counting means for carrying signals in accordance with the count, a second stepping switch having a plurality of contact banks, circuit means for energizing said second stepping switch including a relay and motoring contacts for causing the stepping switch to continue to so long as the relay is actuated, circuit means including said counting output circuits and some of said second stepping switch contact banks for testing the output circuits to determine the count signals that are present, means for deactuating said relay when the last position of said second stepping switch is reached, an energizing circuit for said first stepping switch including a cam actuated switch, cam means actuated by said record playback means for closing said cam actuated switch once each revolution of said playback means to step said stepping switch to the next position, and circuit means interconnecting two banks of said first named stepping switch with corresponding contacts on one bank of said second stepping switch to provide for trace identification of the channel selected by said one contact bank of said first named stepping switch.

References Cited in the file of this patent

UNITED STATES PATENTS

| | | |
|---|---|---|
| 2,566,078 | Bliss | Aug. 28, 1951 |
| 2,656,524 | Gridley | Oct. 20, 1953 |
| 2,680,241 | Gridley | June 1, 1954 |
| 2,771,596 | Bellamy | Nov. 20, 1956 |